United States Patent Office 2,895,946
Patented July 21, 1959

2,895,946

POLYESTERS MODIFIED WITH CHAIN TERMINATING AND CHAIN BRANCHING AGENTS AND PROCESS FOR PRODUCING SAME

William A. H. Huffman, Decatur, Ala., assignor to The Chemstrand Corporation, Decatur, Ala., a corporation of Delaware No Drawing. Application December 16, 1955
Serial No. 553,424

17 Claims. (Cl. 260—75)

This invention relates to new and improved polyesters of high molecular weight. More particularly, the invention relates to modified or cross-linked polyesters or polymers and to the method of making the same.

The simplest form of polymer containing ester linkages is the polyester and it is well known that linear polyesters can be made by heating together a dihydric alcohol or its functional derivatives and a dibasic carboxylic acid or a polyester-forming derivative thereof, such as an acid halide, a salt, or a simple ester of a dibasic acid and a volatile monohydric alcohol. As heating is continued, particularly in vacuum or in a current of an inert gas, condensation continues linearly with formation of longer and longer chains. When these polyesters are in a highly polymerized condition, they can be formed into filaments, fibers, and the like, which can be permanently oriented by cold drawing. That is, when the esterification reaction is carried out for a sufficiently prolonged period under conditions such as to remove the water of reaction effectively, linear polyesters may be produced having extremely high molecular weights, which, in the case of polyesters capable of crystallizing at ordinary temperature, may possess the property of cold drawing. The non-crystalline polyesters of high molecular weight are viscous liquids at ordinary temperatures whereas the crystalline polyesters are hard, tough microcrystalline substances which melt at a definite crystalline melting point to form viscous liquids.

The most widely known and most important commercially of the highly polymeric polyesters is that prepared by the condensation of terephthalic acid or dimethyl terephthalate and a polymethylene glycol containing from 2 to 10 carbon atoms, and particularly ethylene glycol. These polymers or polyesters are relatively insoluble, chemically inactive, hydrophobic materials capable of being formed into filaments which can be cold-drawn to produce textile fibers of superior strength and pliability. However, it should be noticed that these materials are not readily permeable to water and accordingly they cannot be satisfactorily dyed by the ordinary dyeing procedures used in dyeing cotton, wool, natural silk, and regenerated cellulose.

It is known that a slight amount of coloration to secure light shades may be obtained by dyeing polyethylene terephthalate at atmospheric pressure and 100° C. However, such coloration only occurs with one group of dyestuffs, namely, the water-insoluble anthraquinone and azo dyes which are more commonly known as dispersed acetate dyes. Unless a fiber-forming polymer or polyester can be readily dyed on commercial dyeing equipment, the utility of the polymer in the textile field is extremey limited.

The compact structure of polyethylene terephthalate fibers, for example, the molecules of which are closely packed along the axis of the fiber, makes it quite difficult, except with a limited number of dyes, to obtain a high degree of dyebath exhaustion, or to secure satisfactorily deep shades. Absorption and penetration of the dye into the fiber core are limited by the inherent properties of the fiber.

In general, the problem of modifying polyethylene terephthalate, and like polyesters, for dyeability resolves itself into treatment of the fibers with acids, bases, or inorganic salts with the property of hydration, or to more profound modification of the polymer by incorporating molecules into the polymer chain, that destroy, to a degree, the symmetry within the molecular chain or that possess affinity for a given dye. Certain limitations in these approaches are evident. The rather low heat of fusion of polyethylene terephthalate and practical requirements of a fiber-forming polymer restrict greatly the extent of modifications possible, if melting point, crystallinity and fiber properties within the desirable limits are to be retained.

A number of methods have been proposed to increase the dyeability of the polyesters and particularly polyethylene terephthalate. However, these methods have not proved to be entirely satisfactory. One known method of building dyeability with acid dyestuffs into a nondyeable fiber is that of incorporating basic nitrogen in the polymer. However, in the case of polyethylene terephthalate, attempts to copolymerize ethylene glycol and a terephthalic acid derivative with a glycol or dibasic acid containing an amine group did not produce satisfactory fiber-forming materials. When glycols and dibasic acids containing primary and secondary amino groups are employed, cross-linked polymers are generally obtained which are not suitable for use in the manufacture of fibers, filaments, and the like. Further, attempts to form copolymers from glycols and dibasic acids containing a tertiary amine group by the usual known methods have resulted in low molecular weight polymers which in addition to being dark in color, were not suitable for filament and fiber formation. Accordingly, the art has desired some other means to increase the dyeability of polyester structures, such as fibers, filaments, films, and the like.

It is a general object of this invention to provide polyesters having increased affinity for dyestuffs and particularly acetate dyestuffs. It is another object of the invention to provide polyesters which have unique properties when formed into shaped articles. It is a further object of the invention to provide new and improved modified polyesters and a process for preparing the same. It is a still further object of this invention to provide a new process for preparing polyesters without the use of a special second stage catalyst. Other objects of the instant invention will become apparent from the description thereof hereinafter.

It has been found that various chain-terminating agents, for example, methoxypolyethylene glycol, may be polymerized with a glycol and a dicarboxylic acid, such as terephthalic acid, to produce a fiber-forming polyester having increased dye affinity. However, while the dye affinity of the resultant polyester is increased, it has not been possible to increase the dye affinity of the polyester to the desired degree without sacrificing other desirable properties in the structures, such as filaments, produced therefrom. Most important of all, when attempts have been made to introduce into the polymer molecule sufficient chain-terminator to give such desired degree of dye affinity, there has been a reduction in molecular weight of the polyester evidenced by a reduction in its specific viscosity, which is obviously undesirable. The reduction in molecular weight, in many cases, has been such as to render the polyester useless for the formation of filaments and fibers therefrom.

However, it has unexpectedly been found, and in general the objects of the present invention are accomplished, by incorporating a small amount of a chain-branching agent or cross-linking agent in the polyester reaction mixture, along with a chain-terminating agent, a polyester can be produced which not only possesses the desired dye affinity but also, has the necessary molecular weight. That is, the chain-branching agent allows the introduction into the polyester molecule of the necessary amount of chain-terminator without the reduction in molecular weight which is encountered when like amounts of chain-terminator are employed in the polyester reaction mixture without the chain-branching agent. Polyesters produced in this manner are sufficiently stable to be polymerized to higher molecular weights by ordinary polymerization techniques, or to be melt-blended with unmodified high molecular weight polyethylene terephthalate.

In the preparation of polymers or linear condensation polyesters from a dibasic carboxylic acid, or a dialkyl ester thereof and a polymethylene glycol containing from 2 to 10 carbon atoms, the method comprises essentially two steps, which, for sake of simplicity of description, will be described as the same is applicable to the reaction of dimethyl terephthalate and ethylene glycol, it being understood that this is merely illustrative. In the first step or stage, ethylene glycol and dimethyl terephthalate are mixed together and heated at atmospheric pressure in the presence or absence of esterification catalysts, as desired, to form bis-2-hydroxyethyl terephthalate monomer and methanol, which is removed continuously by distillation. It is necessary to employ at least about one molecular proportion of the glycol per molecular proportion of the dimethyl terephthalate. Generally, however, higher proportions of the glycol relative to the ester or acid are used. For example, up to five moles of glycol per mole of dibasic acid or ester are employed because by so doing the initial esterification is said to take place more readily. It is generally desirable to employ a catalyst in order to speed up the reaction. Any well known esterification catalyst may be employed, such as p-toluenesulfonic acid, camphorsulfonic acid, zinc acetate, cobaltous acetate, zinc succinate, antimony oxide, and the like. However, it is preferred to employ manganous formate as a catalyst since it enables the production of higher viscosity polyesters in a shorter period of time. The first stage of the reaction takes place at a temperature in the range of 90° to 250° C.

In the second stage of the reaction, the reaction mass or bis-beta-hydroxyethyl terephthalate is heated at a temperature above the melting point thereof which of course will vary with the nature of the polymer or intermediate product obtained. The temperature is maintained throughout the second stage at a point sufficiently high to maintain a molten mass in the reaction vessel. The heating is continued until the melt produced has colddrawing properties, i.e., filaments formed from the melt are capable of being cold drawn. The heating may be carried out at atmospheric or sub-atmospheric pressures, and preferably in an inert atmosphere in the absence of an oxygen-containing gas. This may be accomplished by bubbling an inert gas, such as nitrogen, through the molten mass. Any inert gas may be employed. During the second stage, glycol is eliminated which is readily volatilized under these conditions and removed from the system. It is desirable, in the second stage, to employ a suitable esterification catalyst, as hereinbefore named, since in the absence of a catalyst, the reaction proceeds at such a slow rate thereby requiring prolonged heating which presents the danger of undesirable color formation in the finished polymer.

The preferred polyester for modification in accordance with the present invention is that produced from dimethyl terephthalate or terephthalic acid and ethylene glycol. In the preferred practice of the instant invention, the reaction vessel is charged with the necessary amounts of dimethyl terephthalate, ethylene glycol, chain-terminator and chain-branching agent, and as a catalyst, manganous formate. The mass is then heated for approximately 1 to 3 hours at a temperature in the range of 150° to 290° C., preferably 175° to 290° C. Thereafter, the vessel is evacuated and the reaction mass heated above its melting point, a temperature in the range of 260° to 290° C. usually being sufficient, and maintained at such temperature for a period of 2 to 4 hours.

Copolyesters can also be modified in accordance with the present invention and the modified copolymers exhibit increased dye-receptivity. For example, the copolyesters formed by the reaction of a glycol, as hereinbefore defined, and two or more aromatic dicarboxylic acids or dialkyl esters thereof, or by the reaction of two or more glycols with one or two or more acids or dialkyl esters thereof. Of particular utility is the copolyester formed by the reaction of dimethylterephthalate, dimethyl isophthalate, and ethylene glycol.

Materials suitable as chain terminators in the practice of this invention are the monohydric polyalkylene oxides and polyalkylvinyl ethers having one terminal hydroxyl group, which compounds are generally referred to as monohydroxyl compounds. Suitable monohydric polyalkylene oxides are those having the general formula:

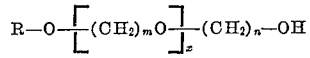

wherein R is an alkyl group containing 1 to 18 carbon atoms or an aryl group containing 6 to 10 carbon atoms, $m$ and $n$ are integers from 1 to 22, and $x$ is a whole number indicative of the degree of polymerization, that is, $x$ could be an integer from 1 to 100 or greater. As examples of substances having the above formula there may be named methoxypolyethylene glycol, ethoxypolyethylene glycol, propoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, and the like. Suitable polyalkylvinyl ethers having one terminal hydroxyl group are the addition polymers prepared by the homopolymerization of alkylvinyl ethers wherein the alkyl group contains from one to 4 carbon atoms. Examples of such chain-terminating agents are polymethylvinyl ether, polyethylvinyl ether, polypropylvinyl ether, polybutylvinyl ether, polyisobutylvinyl ether, and the like. The chain-terminating agents or compounds may be employed in the present invention in amounts ranging from 0.05 mol percent to 4.0 mol percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mol percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weights of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are pentaerythritol; compounds having the formula:

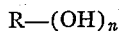

wherein R is a saturated aliphatic hydrocarbon radical containing from 3 to 6 carbon atoms and $n$ is an integer from 3 to 6, for example, glycerol, sorbitol, hexane triol-1,2,6, and the like; compounds having the formula:

$$R—(CH_2OH)_3$$

wherein R is a saturated aliphatic hydrocarbon radical containing from 2 to 6 carbon atoms, for example, trimethylol ethane, trimethylol propane, and like compounds up to trimethylol hexane; and compounds having the formula:

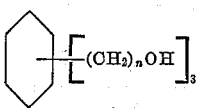

wherein n is an integer from 1 to 6. As examples of compounds having the above formula there may be named trimethylol benzene-1,3,5, trimethylol benzene-1,3,5, tripropylol benzene-1,3,5, tributylol benzene-1,3,5, etc.

Aromatic polyfunctional acid esters may also be employed in this invention as chain-branching agents and particularly those having the formula:

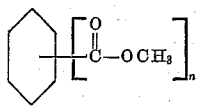

wherein there may be from three to five carbomethoxy groups attached to the carbon atoms of the ring, i.e., wherein n is an integer from 3 to 5. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances when preparing any of the compounds having the above formula, other related compounds having the same formula may be present in small amounts as impurities. This does not affect the compound as a chain-branching agent in the practice of the present invention.

The chain-branching agents or cross-linking agents may be employed in the present invention in amounts ranging from 0.05 mol percent to 2.4 mol percent, based on the amount of dicarboxylic acid or dialkyl ester thereof employed in the reaction mixture. The preferred range of chain-branching agent for use in the present invention is from 0.1 to 1.0 mol percent.

In the practice of the present invention, the calculated amounts of chain-terminating agent and chain-branching or cross-linking agent are charged to the reaction vessel at the beginning of the first stage and the reaction proceeds essentially as outlined above. The first step or stage of the reaction is carried out at atmospheric pressure and at a temperature in the range of 90° to 250° C. and preferably between 150° and 220° C. when from 0.001 to 1.0% by weight, based on the weight of the dicarboxylic acid or ester thereof, of a suitable esterification catalyst is employed. If desired, the reaction may be carried out at pressures above or below atmospheric. Methanol is evolved which is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003% oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected either in the liquid, melt or solid phase. In the liquid phase, particularly, reduced pressures must be employed in order to remove the free ethylene glycol which emerges from the polymer as a result of the condensation reaction.

In the present invention, the first stage of the reaction takes place in approximately ¾ to 2 hours, when employing a suitable esterification catalyst. In the absence of a catalyst, times up to 6 hours may be necessary in order to complete this phase of the reaction. In the second stage, a reaction time of approximately 1 to 4 hours may be employed with a time of 1 to 3 hours being the optimum, depending on catalyst concentration, temperature, viscosity desired, amount of color allowable in the finished polymer, etc.

The modified linear condensation polyesters, produced in accordance with the present invention, have a specific viscosity in the range of 0.30 to 0.60, which represents the fiber- and filament-forming polymers. It is to be understood, of course, that non-fiber-forming polyesters may be produced by means of the present invention, which have a specific viscosity greater or less than that reiterated above and such polyesters are useful, for example, in the manufacture of coating compositions, lacquers, molding compositions, and the like.

An important feature of the instant invention is that the polyethylene terephthalate can be modified with the above chain-terminating and chain-branching agents without any substantial change in reaction conditions normally employed in making unmodified polyethylene terephthalate. This will be a readily apparent advantage from the standpoint of commercial operation. As previously pointed out, the chain-terminating and chain-branching agents, in previously calculated amounts, may be added to the reaction vessel initially before the start of the first stage reaction. If desired, the agents may be added to the reaction vessel during the first or second stage reactions. Controlled addition of the agents is not necessary. It is preferable to add the chain-terminating agents and the chain-branching agents at the beginning of the reaction since by so doing it is not thereafter necessary to open the reaction vessel to the atmosphere prior to completion of the reaction, i.e., completion of the second stage, and the danger of discoloration of the product due to oxidation is avoided. Further, it is preferable to add the chain-branching agent or cross-linker at the start of the reaction since it is a tri-ester and it will have to undergo ester interchange with the dimethyl terephthalate, when the latter is employed. Then again, if the chain-terminating agent and cross-linker are added at the tail end of the reaction (second stage), there is always the danger that excessive heating time may be required to adequately modify the polyester, which excessive heating may result in undersirable color in the polymer. Of course, in many polymers, produced for certain applications, this color formation may not be serious and the addition of the agents toward the end of the reaction would be entirely satisfactory.

It is believed that polyethylene terephthalate has the dye sites required to obtain a satisfactorily dyed article produced therefrom but such drastic conditions are required to obtain such dyeability that there is a resultant decrease in other desirable properties of the article. Polyethylene terephthalate has such a dense structure that dye cannot penetrate the polymer except under drastic conditions, such as by use of dye carriers (swelling agents), high temperatures and high pressures for prolonged periods of time. However, by means of the instant invention, not only are the dye sites in the polymer molecule increased but the structure of the polymer, i.e., the chain packing of the unmodified polyethylene terephthalate, is opened up so that the rate of dyeing is markedly increased. That is, the dye can get into the polymer or article produced therefrom, such as a filament or fiber, much more rapidly under less strenuous conditions thereby alleviating the danger of detracting from other desirable properties of the polymer or polymer article.

The preferred modified linear condensation polyesters, produced in accordance with the present invention, have a specific viscosity ($N_{sp}$) of approximately 0.30 to 0.60. This represents the modified polyesters which can be formed into cold drawable fibers and filaments. It is to be understood, of course, that non-fiber-forming modified polyesters may be produced in accordance with this invention which have a greater or less specific viscosity than that reiterated above.

Specific viscosity, as employed herein, is represented by the formula:

$$N_{sp} = N_{Rel.} - 1$$

where $$N_{Rel.} = \frac{\text{Viscosity of the polymer solution in seconds}}{\text{Viscosity of the solvent in seconds}}$$

Viscosity determinations on the polymer solutions and solvent were made by allowing said solutions and solvent to flow by gravity at 25° C. through a capillary viscosity tube and timing the flow between two points on said capillary tube. In all determinations of polymer solution viscosities, a polymer solution containing 0.5% by weight of the polymer dissolved in a solvent mixture containing two parts by weight of phenol and one part by weight of 2,4,6-trichlorophenol and 0.5% by weight of water, based on the total weight of the mixture, was employed.

To further illustrate the present invention and the advantages thereof, the following specific examples are given, it being understood that these are merely intended to be illustrative and not limitative. Unless otherwise indicated, all parts and percents are by weight.

EXAMPLE I

In this example, unmodified polyethylene terephthalate was prepared to be employed as a control or standard for comparison with the modified polyesters. A mixture or charge of 41 grams of dimethyl terephthalate, 44 ml. of ethylene glycol and 20 mg. of manganous formate (Mn(HCO$_2$)$_2$) was placed in a reaction vessel fitted with a distilling column and heated under a nitrogen atmosphere at approximately 178° C. for a period of 1½ hours. The methanol formed during the reaction was distilled out of the reaction vessel. After all the methanol was removed, the temperature of the reaction mixture was raised to 287° C. for a period of 30 minutes in order to remove by distillation the excess glycol in the vessel. The system was then placed under a vacuum and the pressure therein reduced to less than 1 mm. mercury while maintaining the temperature at 287° C. The polymerization was allowed to proceed for approximately 3 hours to form a polymer in the fiber-forming range which was cold-drawable. The ethylene glycol, formed during the polymerization reaction, was distilled off and collected. The polymer obtained was a light straw color and filaments produced therefrom were cold-drawable. The polymer was then ground until it passed through a 40 mesh screen and the ground polymer was dyed in a dyebath containing 4%, based on the weight of the polymer being dyed, of Eastman Blue GLT dye, at 200° F. for 3 hours. The polymer was removed from the bath, filtered, washed and the filtrate analyzed to determine the amount of dye removed from the bath by the polymer. It was found that 69.3% of the dye in the bath was extracted by the polymer.

EXAMPLE II

A number of modified polyesters were prepared using the procedure as outlined in Example I with the exception that varying amounts of methoxypolyethylene glycol, having a molecular weight of 1520, as chain-terminating agent and varying amounts of trimethyl trimesate as chain-branching agent were employed in the initial reaction mixture. Of the four runs made, all modified polyesters so produced were very light straw in color and filaments produced therefrom were cold drawable. The following table sets out the proportions of modifiers employed and properties of the polymers produced. In all cases, the polymers were dyed as described in Example I. Mol percent in the following table is based upon the amount of dimethyl terephthalate employed in the reaction mixture.

Table I

| Run No. | Methoxy polyethylene glycol (mol. percent) | Trimethyl trimesate (mol. percent) | Catalyst | $N_{sp}$ | Percent dye extracted |
|---|---|---|---|---|---|
| Control (Ex. I) | -------- | -------- | Mn(HCO$_2$)$_2$ | -------- | 69.3 |
| A | 0.70 | 0.25 | Mn(HCO$_2$)$_2$ | 0.366 | 78.7 |
| B | 0.70 | 0.35 | Mn(HCO$_2$)$_2$ | 0.360 | 78.7 |
| C | 1.37 | 0.70 | Mn(HCO$_2$)$_2$ | 0.398 | 83.2 |
| D | 1.37 | 0.60 | Mn(HCO$_2$)$_2$ | 0.391 | 82.0 |

It can readily be seen from the results obtained that the modified polyesters of the instant invention possess considerably enhanced dyeability properties as compared to unmodified polyesters.

EXAMPLE III

To a mixture or charge of 41 grams of dimethyl terephthalate, 44 ml. of ethylene glycol and 20 mg. of manganous formate there was added 0.64 mol percent, based on the dimethyl terephthalate, of ethoxypolyethylene glycol having a molecular weight of 3050 and 0.18 mol percent, based on the dimethyl terephthalate, of trimethyl trimesate. The mixture was placed in a reaction vessel and reacted as outlined in Example I. The polymer obtained was a light straw color and filaments produced therefrom were cold-drawable. The polymer had a specific viscosity of 0.347 and 84.6% dye was extracted from the dyebath when the polymer was dyed as described in Example I. This is a marked improvement over the 69.3% dye extraction obtained by dyeing the control sample of Example I.

EXAMPLE IV

Two runs were made using methoxypolyethylene glycol (mol. wt. 1520) and trimethyl trimesate at different percentages than in Example II. Again the procedure of Example I was followed and the polymers had a good color and were cold drawable. In addition, the polymers showed enhanced dyeability over the unmodified polymer of Example I. The following table sets out data with respect to these runs.

Table II

| Run No. | Methoxy polyethylene glycol (mol. percent) | Trimethyl trimesate (mol. percent) | Catalyst | $N_{sp}$ | Percent dye extracted |
|---|---|---|---|---|---|
| Control (Ex. I) | -------- | -------- | Mn(HCO$_2$)$_2$ | -------- | 69.3 |
| E | 0.70 | 0.18 | Mn(HCO$_2$)$_2$ | 0.400 | 80.5 |
| F | 0.70 | 0.12 | Mn(HCO$_2$)$_2$ | 0.390 | 74.4 |

EXAMPLE V

A mixture or charge of 41 grams of dimethyl terephthalate, 44 ml. of ethylene glycol, 20 mg. of manganous formate, 0.18% by weight, based on weight of dimethyl terephthalate, of pentaerythritol (0.26 mol percent), and 10.7% by weight, based on weight of dimethyl terephthalate, of methoxypolyethylene glycol (mol. wt. 1520) or 1.37 mol percent, was placed in a reaction vessel and reacted as described in Example I. A light straw melt was obtained and filaments produced from the modified polymer were cold-drawable. The polymer had a specific viscosity of 0.383 and when dyed, as in Example I, extracted 79.1% of the dye in the dyebath.

EXAMPLE VI

The procedure of Example I was followed in preparing a modified polyester wherein 0.35 mol percent of sorbitol and 1.37 mol percent of methoxypolyethylene glycol, based on the amount of dimethyl terephthalate present, were added to the reaction vessel at the start. The polymer produced was light amber in color and filaments produced therefrom were cold-drawable. The polymer showed increased dye-receptivity over unmodified polyethylene terephthalate. Likewise, the modified polyester made employing 0.5 mol percent of polyvinylmethyl ether with one terminal hydroxyl group in place of the methoxypolyethylene glycol showed increased dye receptivity over unmodified polyethylene terephthalate.

EXAMPLE VII

A mixture or charge of 78 grams of dimethyl terephthalate, 4.1 grams of dimethyl isophthalate, 16.4 grams of ethoxypolyethylene glycol of a molecular weight of 3000 (1.3 mol percent based on the amount of dimethyl terephthalate and dimethyl isophthalate), 125 mg. of pentaerythritol (0.22 mol percent based on the amount of dimethyl terephthalate and dimethyl isophthalate), 40 mg. of manganous formate and 88 ml. of ethylene glycol was placed in a reaction vessel and heated at a temperature of 177° C. with nitrogen introduction for a period of 1½ hours. Thereafter excess glycol was removed from the reaction vessel by distillation at a temperature of 285° C. The heating was then continued in a nitrogen atmosphere for 3 hours at 285° C. to effect polymerization. The modified copolyester so produced had a specific viscosity of 0.385, good color and a melting point of 240° C. in air. A sample of the modified copolyester was ground to pass a 40 mesh screen and was dyed competitively with unmodified polyethylene terephthalate, produced in accordance with Example I, similarly ground, using a dye solution containing 4%, based on the weight of the polymer being dyed, of Eastman Blue GLT. The dye uptake of the modified copolyester of the present example was 86% as compared to 65% for the unmodified polyethylene terephthalate. Filaments produced from the modified polymer were cold drawable and in fact, remained cold-drawable over a long period of time, whereas auxiliary heating is usually necessary for drawing unmodified polyethylene terephthalate filaments.

EXAMPLE VIII

A number of experiments were run using varying amounts of chain-terminating agents and chain-branching agents in the reaction mixture. All polymers were prepared using dimethyl terephthalate, ethylene glycol and manganous formate as a catalyst, and the procedure as outlined in Example I. The following table shows the varying concentrations and the specific viscosities of the modified polyesters.

*Table III*

| Run No. | Methoxy polyethylene glycol, mol. wt. 3,000, mol. percent | Trimethyl trimesate, mol. percent | $N_{sp}$ | Remarks |
|---|---|---|---|---|
| G | 1.98 | 0.93 | 0.406 | Straw colored melt-cold-drawable. |
| H | 2.36 | 1.24 | 0.435 | Do. |
| I | 3.54 | 1.54 | 0.388 | Do. |
| J | 3.54 | 1.92 | 0.486 | Do. |
| K | 3.54 | 2.31 | 0.517 | Do. |

All of the above samples showed superior dyeability, particularly with the dispersed acetate dyes.

The modified polyesters and copolyesters made in accordance with the present invention show increased dye-receptivity when dyed by known commercial techniques. The polymers show particularly increased dye-receptivity with the dispersed acetate dyestuffs, for example, Celanthrene Fast Yellow GL Conc. 300% (Pr 534), Acetamine Orange GR Conc. 175% (Pr 43), Celanthrene Fast Pink 3B (Pr 235), Celanthrene Brilliant Blue FFS Conc. 200% (Pr 228), and the like.

The modified polyesters and copolyesters of this invention have a different structure from the unmodified polymers. However, this change in structure does not affect the desirable properties found in the unmodified polymers. The present invention enables the preparation of high viscosity or high molecular weight modified polyesters without the necessity of employing a special second stage catalyst. For example, manganous formate is added, in catalytic amounts, to the reaction vessel at the start of the first stage and thereafter it is not necessary to add any more catalyst or any different catalyst.

The modified polyesters of the present invention have improved color over the unmodified polyesters. Significantly, there is only a very small reduction in melting point by modifying polyesters as described herein. This is important, particularly in the manufacture of polyesters which are to be used in making fibers and filaments. Further, the instant modified polyesters have improved melt spinnability and drawing properties. The modified polyesters described herein can also be polymerized to a sufficiently high molecular weight without undue discoloration, thus making them suitable for the formation of films. Numerous other uses and advantages of the present invention will be apparent to those skilled in the art.

Although the invention has been described in terms of its specific embodiments, certain modifications and equivalents will be apparent to those skilled in the art and are intended to be included as a part of the invention, which is to be limited only by the reasonable scope of the appended claims.

I claim:

1. A process for producing fiber-forming modified polyesters which comprises mixing together at least one compound selected from the group consisting of terephthalic acid, isophthalic acid and dimethyl esters of said acids, and at least one polymethylene glycol containing from 2 to 10 carbon atoms, with from 0.05 to 4.0 mole percent, based on the weight of the first-named compound, of a chain-terminating compound selected from the group consisting of monohydric polyalkylene oxides having the formula:

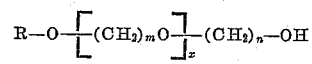

wherein R is selected from the group consisting of alkyl groups containing from 1 to 4 carbon atoms and aryl groups containing from 6 to 10 carbon atoms, $m$ and $n$ are integers from 1 to 4, and $x$ is an integer in the range of 1 to 100, and polyalkylvinyl ethers having a terminal hydroxyl group and wherein the alkyl group contains from 1 to 4 carbon atoms, said ethers being the homopolymerization products of alkylvinyl ethers, and with from 0.05 to 2.4 mole percent, based on the weight of the first-named compound, of a chain-branching agent selected from the group consisting of compounds having the formula:

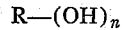

wherein R is a saturated aliphatic hydrocarbon radical containing from 3 to 6 carbon atoms and $n$ is an integer from 3 to 6; compounds having the formula:

wherein R is a saturated aliphatic hydrocarbon radical containing from 2 to 6 carbon atoms; compounds having the formula:

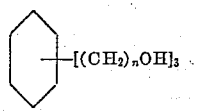

wherein $n$ is an integer from 1 to 6; and compounds having the formula:

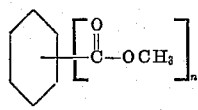

wherein $n$ is an integer from 3 to 5, reacting said mixture by heating the same to a temperature in the range of 90° to 300° C., and continuing the heating and reaction of said mixture until a fiber-forming modified polyester is produced.

2. The process as defined in claim 1 wherein the chain-terminating compound is polymethylvinyl ether.

3. The process as defined in claim 1 wherein the chain-terminating compound is methoxypolyethylene glycol.

4. The process as defined in claim 1 wherein the chain-terminating compound is ethoxypolyethylene glycol.

5. The process as defined in claim 1 wherein the chain-terminating compound is propoxypolyethylene glycol.

6. The process as defined in claim 1 wherein the chain-terminating compound is phenoxypolyethylene glycol.

7. The process as defined in claim 1 wherein the chain-branching agent is pentaerythritol.

8. The process as defined in claim 1 wherein the chain-branching agent is sorbitol.

9. The process as defined in claim 1 wherein the chain-branching agent is trimethyl trimesate.

10. The process as defined in claim 1 wherein the chain-branching agent is glycerol.

11. The process as defined in claim 1 wherein the chain-branching agent is trimethylolethane.

12. The process as defined in claim 1 wherein the mixture contains dimethyl terephthalate and ethylene glycol.

13. The process as defined in claim 1 wherein the mixture contains dimethyl terephthalate, dimethyl isophthalate and ethylene glycol.

14. Modified polyesters prepared by the process of claim 1.

15. Modified polyesters prepared by the process of claim 1 and having a specific viscosity in the range of 0.30 to 0.60.

16. Modified polyethylene terephthalate made in accordance with the process of claim 1.

17. Cold-drawable modified polyester filaments made from modified polyesters prepared by the process of claim 1.

References Cited in the file of this patent

UNITED STATES PATENTS

| | | |
|---|---|---|
| 2,437,046 | Rothrock et al. | Mar. 2, 1948 |
| 2,744,087 | Snyder | May 1, 1956 |

FOREIGN PATENTS

| | | |
|---|---|---|
| 133,258 | Australia | June 21, 1949 |

OTHER REFERENCES

Coleman: J. Polymer Sci. XIV. Pages 15–28 (1954). (Copy in Scientific Library.)